United States Patent
Ou et al.

(10) Patent No.: US 6,558,748 B2
(45) Date of Patent: May 6, 2003

(54) METHOD FOR FORMING EDGE SEALANT FOR WOOD

(75) Inventors: Nian-hua Ou, Watkinsville, GA (US); Robert Palardy, Athens, GA (US)

(73) Assignee: J. M. Huber Corporation, Edison, NJ (US)

( * ) Notice: Subject to any disclaimer, the term of this patent is extended or adjusted under 35 U.S.C. 154(b) by 0 days.

(21) Appl. No.: 09/950,547

(22) Filed: Sep. 11, 2001

(65) Prior Publication Data
US 2003/0064160 A1 Apr. 3, 2003

(51) Int. Cl.⁷ .............................. B05D 1/36; B05D 7/08
(52) U.S. Cl. .................. 427/393; 427/397; 427/408; 427/412.2; 428/541; 428/543
(58) Field of Search .......................... 427/385.5, 392, 427/393, 397, 402, 407.1, 408, 412.2; 428/541, 543

(56) References Cited

U.S. PATENT DOCUMENTS

| | | | | |
|---|---|---|---|---|
| 3,755,215 A | * | 8/1973 | Khoury et al. ............... 521/132 |
| 3,967,581 A | | 7/1976 | Zirbel |
| 4,275,172 A | * | 6/1981 | Barth et al. ................. 264/46.4 |
| 4,663,201 A | * | 5/1987 | House et al. ............. 427/388.2 |
| 5,308,657 A | * | 5/1994 | Markusch et al. .......... 427/284 |
| 5,534,295 A | * | 7/1996 | Schlichter et al. .......... 427/284 |
| 6,180,172 B1 | | 1/2001 | Hasenkamp et al. |

OTHER PUBLICATIONS

Spec Sheet of Laurence–David Inc. of Eugene, Oregon (undated) for Hydrakote OSB–3000 Sealer.
ACI *Technical Bulletin*, PFX97L32B Clear Ultraseal dated (Rev.) Dec. 10, 1997.
*Improved Edgeseal Performance Through Coating Technology and Application Techniques* by Curtis Burton and Brian P. Newman, ACI (undated).

* cited by examiner

Primary Examiner—Erma Cameron
(74) Attorney, Agent, or Firm—Carlos Nieves; D. Mitchell Goodrich

(57) ABSTRACT

A process for forming a polyurea coating on a wood composite substrate comprises the steps of applying an isocyanate to an edge of the wood substrate to form a pretreated edge and applying a polymer latex to the pretreated edge to form the polyurea coating. This polyurea coating provides excellent protection against the penetration of water through the edges and into the interior of the wood composite material and wood composite materials having this polyurea coating have significantly less edge swelling and adsorb considerably less water than wood composites that have no such protective coatings.

14 Claims, No Drawings

METHOD FOR FORMING EDGE SEALANT FOR WOOD

BACKGROUND OF THE INVENTION

Wood has been used as a structural material dating back into prehistoric times. Even today, despite of the development of several new species of composite materials, because of its excellent strength and stiffness, pleasing aesthetics, good insulation properties and easy workability wood remains one of the most widely-used structural materials.

Traditionally, less than half of harvested timber wood was converted to natural solid wood lumber for constructing buildings, homes and smaller items such as tools and furniture, the remainder being discarded as scrap. However, in recent years the cost of high-grade timber wood has increased dramatically as the supply of this wood has shrank due to the gradual depletion of old-growth and virgin forests. Accordingly, because of both the high cost of high-grade timber wood as well as a heightened emphasis to conserve natural resources, wood-based alternatives to natural solid wood lumber have been developed that make more efficient use of harvested wood and reduce the amount of wood discarded as scrap.

Plywood, particle board and oriented strand board ("OSB") are some examples of wood-based composite alternatives to natural solid wood lumber that have replaced natural solid wood lumber in many structural applications in the last seventy-five years. These wood-based composites not only use the available supply of timber wood more efficiently, but they can also be formed from lower grade wood species, and even from wood wastes.

While the strength and insulation properties of these wood-based composites are comparable or superior to natural solid wood lumber, some users have complained that in certain high-moisture environments, such as exterior siding, the edges of the composite material experience swelling and cracking as water penetrates into the edges of the material and causes it to expand. To prevent this edge swelling, some wood composite manufactures have affixed metallic or polymeric moldings to the edges of the wood. This molding reduces the moisture penetration that causes edge swelling while also protecting against wear and abrasion of the edges. However, applying moldings to the wood composites considerably increases the cost and complexity of manufacturing wood composite materials.

A simpler approach that avoids the aforementioned problems is to apply a polymer elastomer film coating to the edges of the composite material. For example, U.S. Pat. No. 5,534,295 discloses applying a first polyisocyanate layer and a second layer composed of at least one of an amine and a polyol to form a polyurea elastomer coating on the edges of the wood composite material.

While this polymer elastomer coating provides a measure of protection against moisture penetration, it also has several disadvantages. First, applying the polyurea elastomer coating during manufacture of wood composites is difficult because the reaction rate between polyisocyanates and amines or polyols is difficult to control. If the reaction proceeds too slowly, then the elastomer remains uncured and has a strongly adhesive quality, so that adjoining wood composite boards that accidentally come into contact with each other may be inadvertently joined together. On the other hand, if the reaction proceeds too quickly, then the elastomer coating will not sufficiently adhere to the board and provide little protection against edge swelling.

Moreover, when applied to a wood composite the elastomer coating forms a hard, brittle film and does not appreciably penetrate into the interior of the wood composite material. Thus, this hard film layer formed on the wood composite edge by the elastomer coating forms a durable, wear-resistant surface, but does not provide a significant amount of protection against water absorption. Additionally, build-up of the film coating on profiled edges of wood composite materials may make fitting adjoining profiled edges together difficult. Yet another important disadvantage is that the amine and polyol chemicals used to form these elastomer coatings are expensive and significantly increase the overall cost of the wood composite product.

Given the foregoing, there is a continuing need to develop polymer coatings that can be applied to the edges of a wood composite material to reduce or eliminate edge swelling. Such coatings should preferably be inexpensive, have excellent water-resistant properties, and be of a consistency and viscosity so that they penetrate into the wood composite material. Additionally, it is preferred that when applied to a profiled edge surface, these coatings do not form a material build-up that will prevent interlocking profiled edges from fitting together.

BRIEF SUMMARY OF THE INVENTION

The present invention relates to a process for forming a polyurea coating on a wood composite substrate comprising the steps of applying an isocyanate mixture to an edge of the wood substrate to form a pretreated edge, and applying a polymer latex to the pretreated edge.

The present invention also relates to a process for preparing a polyurea coating for a wood substrate comprising preparing an isocyanate, and reacting, in-situ, on the wood substrate the isocyanate with a polymer selected from the group consisting of acrylics, and polyvinyl acetates to form the polyurea coating.

The present invention also includes a wood composite having a polyurea coating formed by applying an isocyanate mixture to an edge of the wood composite to form a pretreated edge, and applying a polymer latex to the pretreated edge to form the polyurea coating.

DETAILED DESCRIPTION OF THE INVENTION

The following describes preferred embodiments of the present invention, which provides a process for depositing a polymer coating layer on a wood composite material to reduce the amount of water absorbed by the composite material and thereby reduce edge swelling. This polymer coating layer is formed from relatively inexpensive materials, provides excellent protection against edge swelling, and is suitable for applying to the profiled edges of wood composite materials.

By "mixture" it is meant any combination of two or more substance, in the form of, for example without intending to be limiting, a heterogeneous mixture, a suspension, a solution, a sol, a gel, a dispersion, or an emulsion.

As used herein, "wood" is intended to mean a cellular structure, having cell walls composed of cellulose and hemicellulose fibers bonded together by lignin polymer.

By "wood composite material" it is meant a composite material that comprises wood and one or more other additives, such as adhesives or waxes. Non-limiting examples of wood composite materials include oriented strand board ("OSB"), waferboard, chipboard, fiberboard, and plywood. As used herein, "flakes", "strands", and "wafers" are considered equivalent to one another and are used interchangeably.

All parts, percentages and ratios used herein are expressed by weight unless otherwise specified. All documents cited herein are incorporated by reference. Concentrations of the polymer resins, waxes, fire retardants and other additives used to form the wood composite materials are calculated based on the oven-dried weight of the wood flakes or strands.

For the purpose of explaining to a person skilled in the art of wood composites how to make and use the present invention and to set forth the best mode contemplated by the inventor for carrying out the present invention, the invention will be described with particularity to a specific type of wood composite material, viz., oriented strand board. However, the present invention is equally applicable to other types of wood composite material, such as oriented strand board ("OSB"), waferboard, chipboard, fiberboard, and plywood. A non-exclusive description of wood composite materials to which the presently disclosed edge sealant compositions may be applied may be found in the Supplement Volume to the Kirk-Rothmer Encyclopedia of Chemical Technology, pp 765–810, $6^{th}$ Edition.

OSB panels are derived from a starting material that is naturally occurring hard or soft woods, singularly or mixed, whether such wood is dry (having a moisture content of between 2 wt % and 12 wt %) or green (having a moisture content of between 30 wt % and 200 wt %). Typically, the raw wood starting materials, either virgin or reclaimed, are cut into strands, wafers or flakes of desired size and shape, which are well-known to one of ordinary skill in the art.

After the strands are cut they are dried in an oven to a moisture content of about 2 wt % to 5 wt % and then coated with one or more polymeric thermosetting binder resins, waxes and other additives. The binder resin and the other various additives that are applied to the wood materials are referred to herein as a coating, even though the binder and additives may be in the form of small particles, such as atomized particles or solid particles, which do not form a continuous coating upon the wood material. Conventionally, the binder, wax and any other additives are applied to the wood materials by one or more spraying, blending or mixing techniques, a preferred technique is to spray the wax, resin and other additives upon the wood strands as the strands are tumbled in a drum blender.

After being coated and treated with the desired coating and treatment chemicals, these coated strands are used to form a multi-layered mat. In a conventional process for forming a multi-layered mat, the coated wood materials are spread on a conveyor belt in a series of two or more, preferably three layers. The strands are positioned on the conveyor belt as alternating layers where the "strands" in adjacent layers are oriented generally perpendicular to each other.

Various polymeric resins, preferably thermosetting resins, may be employed as binders for the wood flakes or strands. Suitable polymeric binders include isocyanate resin, urea-formaldehyde, phenol formaldehyde, melamine formaldehyde ("MUF") and the co-polymers thereof. Isocyanates are the preferred binders, and preferably the isocyanates are selected from the diphenylmethane-p,p'-diisocyanate group of polymers, which have NCO-functional groups that can react with other organic groups to form polymer groups such as polyurea, —NCON—, and polyurethane, —NCOON—. 4,4-diphenyl-methane diisocyanate ("MDI") is preferred. A suitable commercial MDI product is Rubinate pMDI available from ICI Chemicals Polyurethane Group. Suitable commercial MUF binders are the LS 2358 and LS 2250 products from the Dynea corporation.

The binder concentration is preferably in the range of about 1.5 wt % to about 20 wt %, more preferably about 3 wt % to about 10 wt %.

A wax additive is commonly employed to enhance the resistance of the OSB panels to moisture penetration. Preferred waxes are slack wax or an emulsion wax. The wax loading level is preferably in the range of about 0.5 to about 2.5 wt %.

After the multi-layered mats are formed according to the process discussed above, they are compressed under a hot press machine which fuses and binds together the wood materials to form consolidated OSB panels of various thickness and sizes. Preferably, the panels of the invention are pressed for 2–10 minutes at a temperature of about 175° C. to about 240° C. The resulting composite panels will have a density in the range of about 35 to about 50 pcf (as measured by ASTM standard D1037-98) and a thickness of about 0.6 cm (about ¼") to about 3.8 cm (about 1½").

After the OSB panels are constructed according to the preceding discussion, a polyurea edge sealing composition is applied to the edges of the panels. This sealing composition is applied by first contacting the edge of an OSB panel with an isocyanate to pretreat the edge and then a polymer latex (a water-based emulsion containing polymer solids) is applied to the pretreated edge. As the polymer latex is being applied to the pretreated edge, the isocyanate and polymer solids react, in situ, on the surface of the OSB panel to from a polyurea coating, with carbon dioxide gas produced as a by-product of the condensation reaction between isocyanates and the polymer solids. A portion of the carbon dioxide by-product gas becomes dispersed in the liquid polyurea coating. This carbon dioxide gas phase dispersed in a continuous phase of the liquid polyurea can be characterized as a polyurea coating foam. This coating foam increases the penetration of the polyurea coating into the wood composite material to fill the voids located along the edges of the composite material and thus, provide further protection against water penetration.

The isocyanate compounds in the polyurea coating form urethane bonds with the hydroxyl and carboxyl groups extending from the cellulose and hemicellulose molecules so that the polyurea coating strongly adheres to the wood composite substrate material. Additionally this polyurea coating is quite durable and resistant to mechanical abrasion and wear because the isocyanate molecules form cross-links between adjacent latex polymer chains so that a durable polymer coating having a three-dimensional polymer network is formed.

Any of the isocyanate adhesives mentioned above are suitable isocyanates for use in forming the polyurea coating layer. Preferred isocyanates are those of the diphenylmethane-p,p'-diisocyanate family of polymers. The isocyanate may be applied to the edge of the wood composite material either neat or in a mixture and the isocyanate may be mixed with drying oils such as tung oil and linseed oil. Emulsifiers can be added to the isocyanate in order to allow the isocyante to be mixed with water. An isocyanate containing an emulsifier forms the discontinuous phase of an emulsion upon being added to water, so that the isocyanate does not precipitate or separate from the water. By contrast when the isocyanate does not containing an emulsifier, then an emulsion is not formed, and when the isocyanate is added to water it is possible that the isocyanate may separate from the continuous water phase.

The mixture preferably contains isocyanate and oils in a ratio of about 20:1 to about 1:20.

The polymer latex is a water-based polymer emulsion: a dispersed polymer phase is suspended in a continuous water phase. Typically the dispersed polymer is an acrylic polymer. The polymer latex may also contain an emulsified wax.

Isocyanates, isocyanate mixtures, and polymer latexes can be applied to the edge of a wood substrate to form, in-situ, polyurea coatings using conventional application techniques such as brushing, rolling and spraying. However, because spraying is not a particularly efficient way of applying a chemical composition (because much of the chemical composition that is sprayed does not contact the target substrate) it may not be a desirable way to apply high-cost compounds such as isocyanates. In order to more efficiently apply the chemical compounds, it is preferred that the application instrument, whether it be a brush, roller or spray nozzle, be adapted to the profile of the edge or surface of the substrate to be coated.

The polyurea coating should be applied to the wood composite material at a thickness sufficient to provide a layer of protection resistance against water penetration and absorption. Applying the isocyanate mixture and the polymer latex to the wood substrate at a concentration of from about 1 g/m to about 10 g/m will provide a coat of sufficient thickness to prevent or significantly reduce water absorption.

A particular advantage of the polyurea coatings of the present invention is that they are relatively thin, which allows them to be applied to the profiled edges of wood composites. Panels having profiled edges are useful when it is desired to connect panels to each other. For example, the tongue formed on the edge of a first wood composite panel and the groove formed on the adjoining edge of an adjacent second composite panel can cooperate to interlock the adjacent panels together. Other polyurea coatings are unacceptable for use with profiled edges, because the build-up of the coating prevents the edges from fitting together properly.

The invention will now be described in more detail with respect to the following specific, non-limiting examples.

EXAMPLE I

A 24 hour immersion test was carried out with OSB wood composite materials to determine the edge sealing performance of polyurea coating compositions formed by reacting an isocyanate and a polymer latex on the OSB material.

OSB squares measuring approximately 15.25 cm on each side, and having a target cross-sectional thickness of approximately 2 cm, and a target density of 670 kg/m$^3$, were cut from OSB panels. Each OSB panel has three layers: a core layer sandwiched between two surface layers. The OSB panels were prepared by mixing pre-dried Southern yellow pine wood strands having a moisture content of between 2 wt % and 7 wt %, with 1.8 wt % slack wax, and an amount of polymeric binder. The polymeric binder in the surface layers was phenol formaldehyde added at a concentration of 2 wt %, and in the core layer the binder was MDI at a concentration of 1.8 wt %.

The OSB panels were formed as follows. The wood strands were blended in a drum blender with the wax and polymeric binder for approximately 2 minutes. The strands were then deposited on a conveyor belt to form a mat having three layers and the mat was then hot-pressed. Hot press conditions were as follows: (1) press closing time: 30 seconds, (2) press cooking time: 180 seconds, (3) de-gas time: 15 seconds, (4) press control temperature: 205° C.

Four different polyurea coating compositions were formed on the edges of several OSB squares in the following manner. First, an isocyanate layer was brushed on to the edges of the each OSB square at the linear concentration levels (in units of g/m, based on weight of solids) indicated in Table I below. Each square was then allowed to sit for 5 to 10 minutes before the polymer latex layer was brushed on to each edge at the concentration levels (g/m, based on weight of solids) indicated in Table I below. Each of the four different polyurea compositions (i.e., compositions 1–4) were formed on several different OSB squares and the results averaged. The results were compared with data obtained from OSB squares left untreated (i.e., no isocyanate or polymer latex was applied) as well as OSB square in which either isocyanate or latex polymer (but not both) were applied alone (Compositions 5–7).

TABLE I

|  | MDI (g/m) | EMDI (g/m) | MDI & Oil (g/m) | ACI (g/m) | Swelling % |
|---|---|---|---|---|---|
| Untreated Square | — | — | — | — | 6.7 |
| Composition 1 | 2.4 | — | — | 2.4 | −0.7 |
| Composition 2 | — | 2.4 | — | 2.4 | −1.7 |
| Composition 3 | — | — | 2.4 | 2.4 | −1.5 |
| Composition 4 | — | 1.2 | — | 1.2 | −1.6 |
| Composition 5 (no isocyanate) | — | — | — | 1.2 | 3.9 |
| Composition 6 (no isocyanate) | — | — | — | 2.4 | 2.4 |
| Composition 7 (no latex polymer) | — | 2.4 | — | — | 3.7 |

MDI is 4,4-diphenyl-methane diisocyanate available under the tradename RUBINATE 1840.

EMDI is an emulsion of 60 wt % emulsifiable RUBINATE 1780 MDI and 40 wt % water.

ACI is an acrylic latex polymer available from Associated Chemists Inc. of Portland, Oreg.

MDI Mix is a 1:1 mixture of linseed oil and RUBINATE 1840.

After the isocyanate and polymer latex layers were applied as discussed above to form the polyurea composition, the composition was allowed to dry for at least 24 hours.

The squares were then completely immersed in tap water where they remained for 24 hours, with all of the edges being exposed to water, which was maintained at a constant temperature of 70° C. After being removed from immersion in the water, measurements of the cross-sectional thickness along each of the four edges were made, and the four measurements averaged to obtain an average edge cross-sectional thickness. Then four measurements of the cross-sectional thickness were made at four different interior points, each of the interior points being located 1 inch away from the adjacent edge, and the four measurements averaged to obtain an average interior cross-sectional thickness. Thickness measurements were made with a micrometer.

The "Swelling %" reported in table I above, is the percentage increase in the average edge cross-sectional thickness minus the percentage increase in the average interior cross-sectional thickness. Thus a negative number in this column indicates that there was greater swelling in the interior of the panel than at the edge.

As can be seen from the table, the untreated OSB squares as well as the OSB squares that had been treated with only one but not both of polymer latex and isocyanates experienced between 2.4% and 6.7% edge swelling, which is an amount of swelling that would be unacceptable to some users. By contrast, the OSB squares coated with the polyurea compositions experienced little edge swelling, but rather had very stable edge dimensions. Indeed, in all of the OSB squares coated with the polyurea composition, the edges were so well-protected against water absorption by the polyurea composition, that the interior of the panel experienced greater swelling than the edge did (as indicated by the negative number for the swelling% for compositions 2–4).

As can be seen in the table, excellent protection against edge swelling was obtained from polyurea compositions made from a variety of different isocyanate compositions, including emulsified MDI and a mixture of MDI and linseed oil. The data also reveal that the amount of edge swelling of a wood composite material treated with an isocyanate layer and a polymer latex layer is significantly less than when the wood composite material has no edge sealing treatment or the wood composite material is treated with only a polymer latex or an isocyanate layer alone, but not both in combination.

This data demonstrates that treating the edges of a wood composite panel with a polyurea edge sealing coating provides excellent protection against edge swelling caused by the absorption of water. The substantial reduction in the amount of edge swelling shown in the above example would be unexpected by one of ordinary skill in the art.

EXAMPLE II

Water absorption and swelling tests (also sometimes referred to as the "kitchen cabinet test") were carried out with OSB wood composite materials to determine the edge sealing performance of mixtures of an isocyanate and a polymer latex. OSB samples measuring approximately 7.6 cm by 30.5 cm (3 in. by 12 in.), and having a target density of 670 kg/cm were cut from the OSB panels prepared as above in Example I. One edge on each sample was treated with one of the edge sealing compositions described in Table II (hereinafter referred to as the "treated edge"). A control group of samples was left completely untreated. The sealing composition was then allowed to dry for at least 12 hours.

TABLE II

|  | MDI (g/m) | EMDI (g/m) | ACI (g/m) | Swelling % | Absorption % |
|---|---|---|---|---|---|
| Untreated sample | — | — | — | 16.8 | >5% |
| Composition 1 (no polymer latex) | — | 2.4 | — | 10.3 | 2.9 |
| Composition 2 | 2.4 | — | 1.2 | 4.5 | 2.0 |
| Composition 3 | — | 2.4 | 1.8 | 5.3 | 2.4 |
| Composition 4 (no isocyanate) | — | — | 2.4 | 4.8 | 2.1 |
| Composition 5 | — | 1.2 | 2.4 | 2.0 | 1.2 |
| Composition 6 | — | 2.4 | 2.4 | 1.3 | 1.0 |
| Composition 7 | — | 2.4 | 0.4 | 1.1 | 0.8 |

A water-tight, open top container was used for the test. The bottom of the container is covered with sponges having a thickness of 4 cm. Water is added to the sponge layer until the sponges are saturated and there is approximately 2.5 cm of liquid water in the bottom of the container. An initial measurement of the weight of the samples was made and then the samples placed in a water bath, so that the test edge was facing down, in contact with the sponges. After 72 hours the samples were removed and a final measurement of the weight and the thickness of the samples made. Thickness measurements were made two inches from the Three measurements of the cross-sectional thickness were made at three different interior points, each of the interior points being located just adjacent to the treated edge of each sample (within 5 millimeters of the edge). Two of these three measurements were made two inches from each end of the sample, and a third was made at the mid-point.

Three sections were marked along the test edge of each OSB sample so that the micrometer anvil is just inside the panel edge. Two of the sections should be located approximately two inches from the specimen ends and the third at the midpoint of the edge.

The absorption% reported above in Table II is calculated as follows:

$$Absorption\ \% = \frac{(W_2 - W_1)}{W_1} \times 100$$

where $W_1$ is the initial weight measurement of the samples; and
$W_2$ is the final weight measurement of the samples.

The swelling% reported above in Table II is calculated as follows:

$$Swelling\ \% = \frac{(T_2 - T_1)}{T_1} \times 100$$

where $T_1$ is the initial thickness measurement of the each sample; and
$T_2$ is the final thickness measurement of the each sample.

After exposure, the untreated OSB samples (those having no polymer latex or isocyanate compounds applied) experienced, on average, a 16.8% edge swelling, which is an amount of swelling that would be unacceptable to some users. The untreated OSB samples also absorbed greater than 5% water, on average.

By contrast, the OSB samples having the polyurea coating composition experienced significantly less edge swelling and absorbed much less water. The data also demonstrates that OSB samples treated with this polyurea coating composition experienced significantly less edge swelling and absorbed much less water than when either a polymer latex or isocyanate layer are applied to the OSB alone.

Thus, the above data demonstrates that wood composite panels treated with a polyurea coating composition experience virtually no edge swelling, while untreated wood composite panels, or wood composite squares treated with only one of isocyanate compounds and latex polymers experience an amount of edge swelling that may be deemed considerable. Such a substantial reduction in the amount of edge swelling would be unexpected by one of ordinary skill in the art.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A process for forming a polyurea coating on a wood composite substrate comprising:
   (a) applying an isocyanate, at a concentration of from about 1 g/m to about 20 g/m, to an edge of the wood substrate to form a pretreated edge; and
   (b) applying a polymer latex to the pretreated edge.

2. The process according to claim 1, wherein the isocyanate comprises a diphenylmethane-p,p'-diisocyanate polymer.

3. The process according to claim 2, wherein the isocyanate further comprises an emulsifier.

4. The process according to claim 3, wherein the emulsifier is selected from the group consisting of tung oil and linseed oil.

5. The process according to claim 1, wherein the isocyanate comprises a diphenylmethane-p,p'-diisocyanate polymer and drying oils in a ratio of from about 20:1 to 1:20.

6. The process according to claim 1, wherein the polymer latex comprises a polymer selected from the group consisting of acrylics and polyvinyl acetates.

7. The process according to claim 1, wherein the polymer latex comprises a wax emulsion.

8. The process according to claim 1, wherein the polymer latex comprises a polyurea catalyst.

9. The process according to claim 1, wherein the wood substrate is selected from the group consisting of plywood, particleboard, flakeboard, and oriented strand board.

10. A process for preparing a polyurea coating for a wood substrate comprising:

providing an isocyanate; and reacting in-situ on an edge of the wood substrate the isocyanate with a polymer selected from the group consisting of acrylics and polyvinyl acetates to form the polyurea coating.

11. The process according to claim 10, wherein a urethane bond is formed between isocyanate and a radical on the wood substrate, the radical being selected from the group consisting of a hydroxyl group, and a carboxyl group.

12. The process according to claim 10, wherein the polyurea coating is present in liquid form and whereby carbon dioxide gas is produced as a by-product of the reaction between the isocyanate and the polymer such that a foam is produced, the foam comprising a carbon dioxide gas dispersed phase and a polyurea liquid continuous phase.

13. A wood composite having a polyurea coating formed by:

(a) applying an isocyanate, at a concentration of from about 1 g/m to about 20 g/m, to an edge of the wood composite to form a pretreated edge; and (b) applying a polymer latex to the pretreated edge to form the polyurea coating.

14. The process according to claim 1, wherein the edge is profiled.

* * * * *